Feb. 28, 1967  H. LUDWIG  3,305,895
INJECTION MOLDING APPARATUS FOR SHOE BOTTOMS
Filed Feb. 16, 1965  5 Sheets-Sheet 1

INVENTOR.
Herbert Ludwig
BY
Roberts, Cushman & Grover
ATT'YS

United States Patent Office 3,305,895
Patented Feb. 28, 1967

3,305,895
INJECTION MOLDING APPARATUS
FOR SHOE BOTTOMS
Herbert Ludwig, 112 Demastrasse,
Usen, near Bremen, Germany
Filed Feb 16, 1965, Ser. No. 433,146
16 Claims. (Cl. 18—34)

This invention relates to the manufacture of shoes with molded bottoms attached by means of bottom-molding apparatus and, in particular, to an improved apparatus for applying such bottoms.

In my pending application Serial No. 405,147, filed October 20, 1964, there is shown and described a bottom-molding apparatus wherein a last is held against the open top of the mold ring in spaced relation to a sole plate supported at the bottom side of the ring and there are passages or channels in the mold ring to deliver bottom-forming composition directly to the mold cavity in one position of the sole plate and other passages in the sole plate to deliver bottom-forming composition directly to the mold cavity in another position of the sole plate, the passages in the ring being blocked when the sole plate is in one position and the passages in the mold plate being blocked when the sole plate is in the other of the positions. These passages are also provided with branches to enable rapid injection and distribution both to the immediate and distant part of the mold cavity so as to obtain uniform filling of the mold cavity. This invention has for its objects, in addition to the foregoing, to enable applying multiple layers to the bottom in such fashion as to enable utilizing bottom-forming compositions embodying properties which are best suited for different parts of the bottom with respect to different wearing properties, comfort, economy in manufacture and appearance.

As herein illustrated, the apparatus comprises a mold ring, a last adapted to support an upper lasted thereto engaged with the open top of the ring, and a sole plate supported at the bottom side of the ring for movement relative to the ring to establish, by its position, the depth of the mold cavity. The mold ring may contain a groove in its inner side circumferentially of the sole plate, corresponding in depth to the thickness of the bottom to be applied so that the first layer injected may embody an edge extending downwardly from the bottom corresponding in thickness to the bottom to be attached. According to the invention, the bottom is formed by applying two layers in succession and the apparatus comprises a barrier recessed into the sole plate beneath the lasted upper at a predetermined fixed level, the sole plate being movable relative thereto so that the barrier effectively excludes bottom-forming composition from the part of the mold cavity within which it is located in the different positions of the sole plate. The barrier is operative, in conjunction with the sole plate when the latter is in the first position, to form a first layer and in the second position to exclude bottom-forming composition from that portion of the first layer with which the barrier has contact at the termination of the first injection. The barrier may be opposite the forepart, shank or heel and if the mold ring is split the barrier may comprise portions extending toward each other from opposite sides of the ring halves or it may be a part extending from one half all the way across to the other. Optionally, the barrier may be supported by the bed on which the mold ring rests. A flat cover plate may be substituted for the last and a multi-layer sole formed in the mold cavity in the same manner as when applied to the bottom of the lasted upper. Soles preformed in this manner may be adhesively or otherwise attached to the bottom of the lasted upper. If desired, the sole-molding device may embody a plurality of mold cavities so that several soles may be formed at the same time.

In apparatus of the foregoing kind, wherein injection is effected through the ring directly into the mold cavity to form a first layer and thereafter by lowering the sole plate a space is provided for additional injection through openings in the sole plate, it is possible that the openings in the sole plate may become prematurely plugged with the bottom-forming composition injected through the ring thus preventing injection of a second layer. In accordance with this invention, this difficulty is overcome by recessing the end of the passage where it enters the mold cavity from the sole plate by providing a small circular recess in the sole plate where the passage enters the mold cavity and by placing a flat circular disc in the recess so as to fill it and hence block entrance of the bottom-forming composition into the passage. The disc may be comprised of felt or a compatible plastic, becomes attached to the plastic injected into the cavity through the ring so that when the sole plate is lowered it remains attached to the inner layer injected through the ring, and subsequently becomes embedded between this and the outer layer injected through the sole plate.

The method for using my novel apparatus comprises holding a lasted upper against the top of a mold ring, supporting a composite sole plate in the mold cavity below the bottom of the lasted upper comprised of fixed and movable parts, the fixed part being situated at a predetermined position below the bottom and the movable part being movable from a position at the level of the fixed part to a position below it, moving the movable part to the level of the fixed part, injecting bottom-forming composition to fill the mold cavity to form a first layer, allowing the bottom-forming composition to set, lowering the movable part below the fixed part, injecting bottom-forming composition to fill the enlarged cavity about the fixed part, allowing the bottom-forming composition to set and then stripping the finished shoe from the mold.

The invention will now be described in greater detail with reference to the accompanying drawings wherein.

Figure 1:
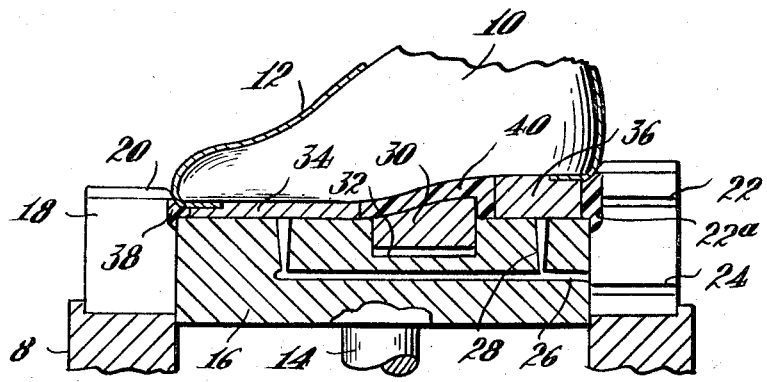
FIG. 1 is a longitudinal section of an example of the invention with the barrier located opposite the shank of the last.

Referring to FIGS. 1 to 11, inclusive, there are shown various injection molds which are suitable for producing multi-ply soles for the purposes related above. The injection molds are of similar construction, each comprising a last 10 for receiving an upper 12, a vertically displaceable bottom ram 14, the upper part 16 of which constitutes the sole plate, and a mold ring comprised of two halves 18a and 18b. A lip 20 is secured to the upper side of the mold halves to enable forming a suitable seal between the shoulder at the lower part of the last and the mold ring during injection. The ring 18 rests on a supporting bed 8. The mold assembly, as illustrated, provides for applying a bottom comprised of two layers by moving the ram and hence the sole plate 16 within the mold ring to a first position spaced from the lower side of the last to receive a first injection, and then to a second position below that of the first for injection of a second layer.

To enable such injection the mold ring is provided with an injection passage 22, one half of which is in each of the faces of the ring halves 18a, 18b, which enter the mold cavity above the surface of the sole plate when the latter is in its uppermost position so that the bottom-forming composition is injected directly into the mold cavity. This passage 22 may be supplemented by branch passages and a recess peripherally of the ring halves with which it is connected to effect rapid and uniform distribution to all the parts of the mold cavity as described, for example, in my pending application Serial No. 405,147, filed October 20, 1964. The mold ring is also provided with a passage 24, one half of which is contained in each of the ring halves, which is adapted to be placed in communication with a passage 26 in the sole plate 16 by lowering the latter from the position shown in FIG. 1 after the first injection is made to align it with the passage 24. The passage 26 is provided with one or more substantially vertical branch passages 28 which enter the mold cavity through the sole plate and one or more laterally extending branch passages extending laterally from substantially the center line of the sole plate to the edges thereof as is also illustrated in the aforesaid pending application.

In accordance with this invention, the sole plate 16 comprises fixed and movable parts, the fixed part being situated at a predetermined level below the bottom of the lasted upper and the movable part being movable from a position substantially level with the fixed part to a position below the fixed part.

Figure 2:
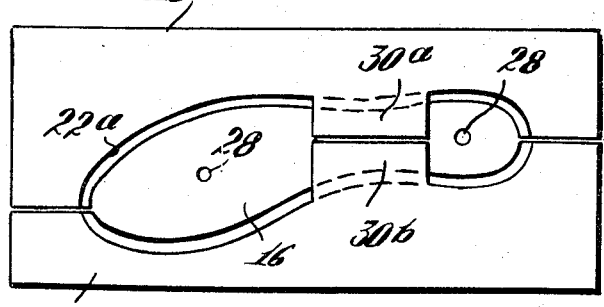
FIG. 2 is a plan, partly in section, of the injection mold shown in FIG. 1, showing the barrier comprised of two parts extending from the mold ring halves toward each other.
Figure 3:
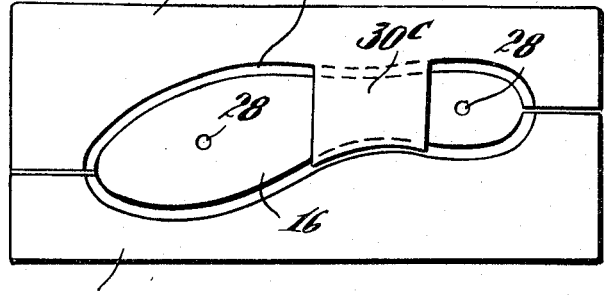
FIG. 3 is a view corresponding to FIG. 2, showing the barrier as a single part extending from the mold ring at one side to the other side.

As illustrated in FIGS. 1 to 3, inclusive, the fixed part 30 is situated opposite the shank of the last and has a surface contour corresponding to that of the shank of the lasted upper. The movable part 16 contains a recess 32 for slidably accommodating the fixed part 30 to enable movement of the movable part 16 upwardly and downwardly relative to the bottom of the lasted upper and the fixed part. The fixed part 30 is fixed relative to the mold halves 18a, 18b so that as the sole plate 16 is raised and lowered by movement of the ram, the fixed part remains at a predetermined position relative to the bottom of the last and constitutes a barrier or gate which controls the flow of the bottom-forming composition in the mold cavity in the region of the shank. The barrier 30 may comprise two parts 30a and 30b formed integral with the mold halves 18a and 18b and extending toward each other across the mold cavity into engagement, as shown in FIG. 2, or it may comprise a single part 30c extending from one or the other of the parts 18a, 18b across to the opposite one as shown in FIG. 3.

As thus constructed, with the ram 14 lowered to the position shown in FIG. 1, so that the sole plate is spaced from the bottom of the lasted upper, a first layer may be injected around a filler 34 at the forepart, the barrier 30 and a filler 36 at the heel end to form an edge 38 peripherally of the shoe and of the fillers and to form a shank piece 40. After this has set the ram 14 is lowered relative to the barrier 30 whereupon a second layer is injected through the now aligned openings 24 and 26 through the sole plate to fill the mold cavity within the edge 38 around the barrier which, by its contact with the first layer at the shank, prevents injection of the second layer at the shank. Thus, the part 32 provides a barrier or gate which controls the distribution of the bottom-forming composition as it enters the mold cavity. By means of two-layer injection the finished bottom will have an edge the full depth of the bottom, a shank and heel cover formed of one kind or color material, and a sole and a heel lift of another kind or color.

With this apparatus if the inserts 34 and 36 were to be omitted at the forepart and heel, a first layer may be applied to the entire bottom of the lasted upper so as to form an insole at the forepart, a shank, a heel and a peripheral edge, and then by lowering the ram to increase the depth of the mold cavity a second layer may be applied to the first layer within the edge to form an outsole at the forepart and a heel lift.

Figure 4:
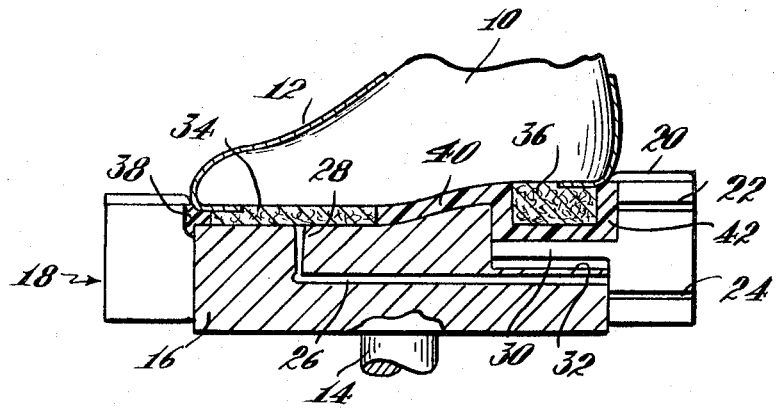
FIG. 4 is a longitudinal section of another example of the invention with a barrier located opposite the heel end.
Figure 5:
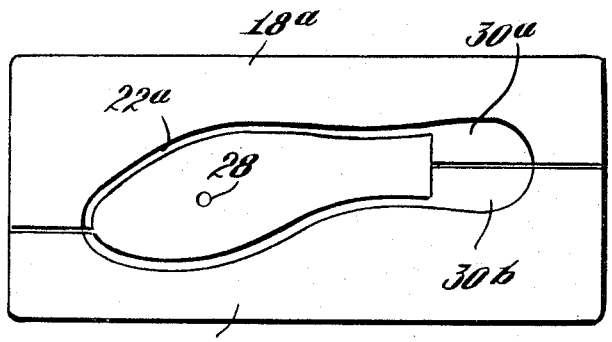
FIG. 5 is a plan view, partly in section, showing the barrier comprised of two parts extending from the ring halves toward each other.
Figure 6:
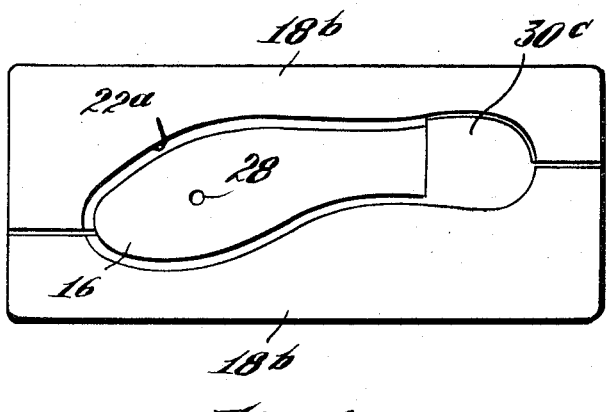
FIG. 6 is a corresponding view showing the barrier in one piece and extending from one half of the ring toward the other.

In FIGS. 4, 5 and 6 the barrier 30 is located opposite the heel end in a recess 32 and may comprise two parts 30a and 30b extending from the two halves of the mold ring toward each other, or a single part 30c extending from one of the mold halves toward the other. In this form a first layer is injected through the passage 22 into the mold cavity about the inserts 34 and 36 to form an edge 38 peripherally of the shoe, a shank 40 and a heel cover 42. By lowering the ram to a position in which the passage 24 becomes aligned with the passage 26, which lowers the sole plate relative to the barrier 30, a forepart layer may be applied to the lower side of the filler 34 within the edge 38. Since the barrier 30 remains in a fixed position it prevents access of bottom-forming composition in this region hence the second layer extends only from the tip of the toe to the breast line of the heel.

Figure 7:
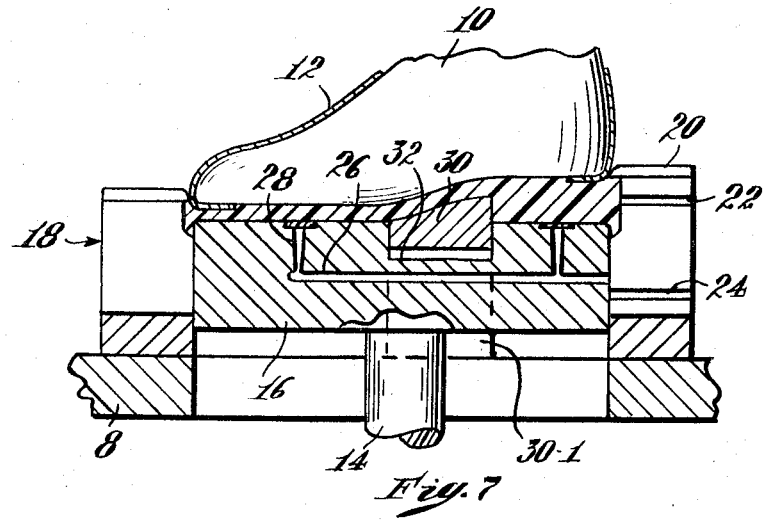
FIG. 7 is a longitudinal section showing a barrier opposite the shank which is secured to the frame of the apparatus.
Figure 8:
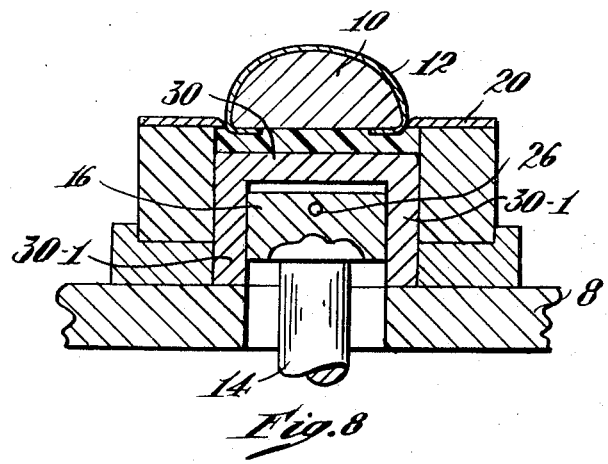
FIG. 8 is a cross-section of the embodiment shown in FIG. 7.

FIG. 7 shows a modification in which the barrier 30 is located opposite the shank of the last but instead of being rigidly attached to the mold halves, it is connected to the supporting bed 8 for the mold ring. To this end the barrier 30 has at its opposite ends downwardly projecting parts 30–1 (FIG. 8) which rest on and are secured to the bed 8. A similar construction embodying attachment of the barrier 30 to the supporting bed 8 where the barrier is located opposite the heel end is shown in FIGS. 9 and 10.

Figure 9:
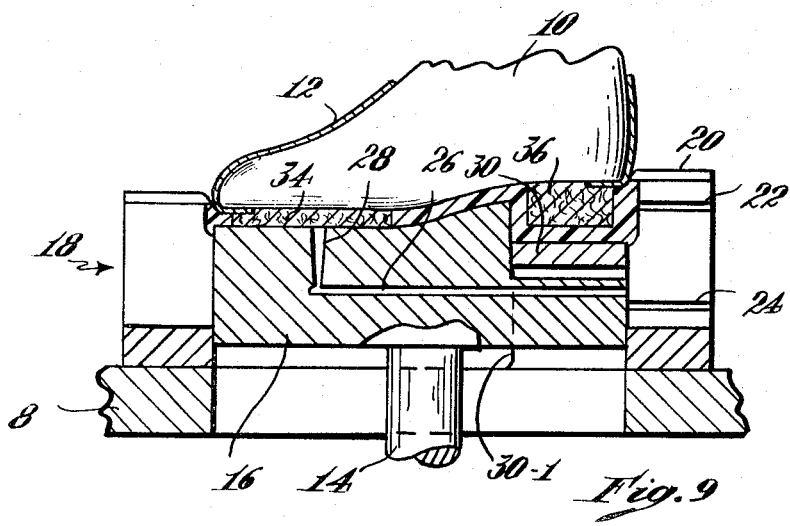
FIG. 9 is a longitudinal section like that shown in FIG. 7, in which the barrier is opposite the heel.
Figure 10:
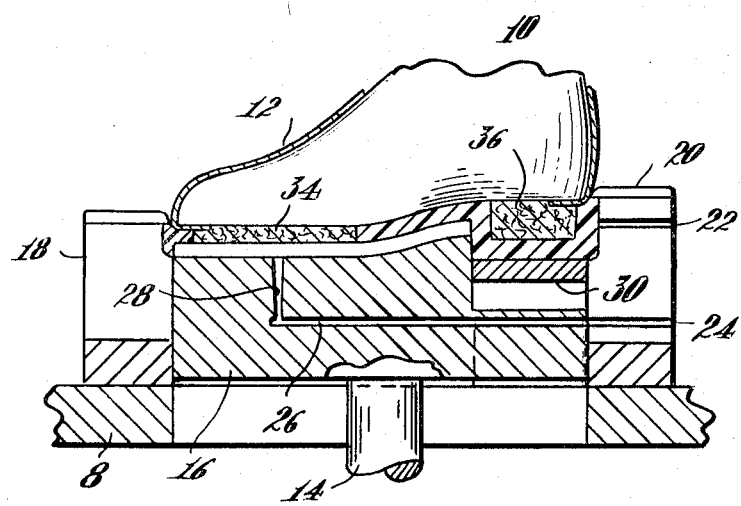
FIG. 10 is a view similar to FIG. 9, showing the formation of the first layer about the inserts and the position of the parts just before injection of the second layer.

In either of the structures shown in FIGS. 7 and 8 or 9 and 10, a two-layer bottom may be formed with or without filling members at the forepart and heel. Without the filling members the structure shown in FIGS. 7 and 8 can be used to form an inner sole, a heel and an edge peripherally of the sole by means of a first injection and an outsole only at the forepart, that is, up to the shank, by means of the second injection. When inserts are used, as shown in FIGS. 9 and 10, the first injection results in an insole, shank and heel cover and the second injection is an outsole and shank.

One of the difficulties encountered in the use of apparatus of this kind is the filling or plugging of the ends of the passages entering the mold cavity through the sole plate by the bottom-forming composition injected through the ring during the formation of the first layer. This can be corrected, as herein illustrated (FIG. 11), by providing a circular recess 60 in the surface of the sole plate, concentric with each of the passages 28, and inserting flat discs 62 of felt or a compatible plastic into the recess. During the first injection the discs will prevent the bottom-forming composition from entering the passages 28. The discs will, however, adhere to the first layer when it sets up, so that when the sole plate is lowered they will be withdrawn from the recesses leaving the ends of the passages clear for the injection of the second layer. The discs are preferably made of compatible material hence their inclusion will in no way be detrimental to the bottom structure. Although the provision of the recesses and discs is only illustrated specifically in FIGS. 11 and 12, it may be used in all of the forms of the apparatus herein illustrated.

Figure 11:
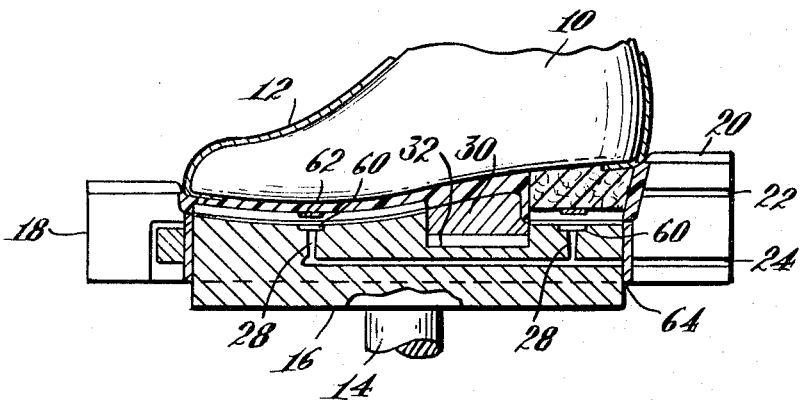
FIG. 11 is a longitudinal section of a modification in which a shield is interposed between the ring and the sole plate.
Figure 12:
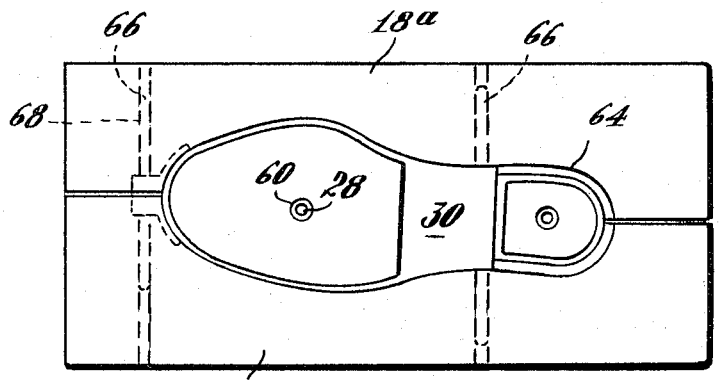
FIG. 12 is a plan view of the assembly shown in FIG. 11.

FIGS. 11 and 12 also illustrate a modification of the invention wherein a sleeve 64 is interposed between the inner side of the mold halves and the sole plate in fixed relation to the mold halves. The upper edge of the sleeve determines the depth of the mold cavity and the ram is movable relative thereto. The sleeve 64 is supported by transversely extending rods 66 disposed in transversely extending holes 68 formed in the mold halves. In this form the sole plate contains a recess 32 opposite the shank of the shoe in which there is situated the barrier 30, the ends of which are fixed to the sides of the sleeve. The sole plate has two branch passages 28, one at the forepart and one at the heel. A first layer is injected to form an insole and peripheral edge at the forepart, a shank and a heel, whereupon the sole plate is lowered and an outsole is injected within the edge up to the shank and a heel lift is injected.

Figure 13:
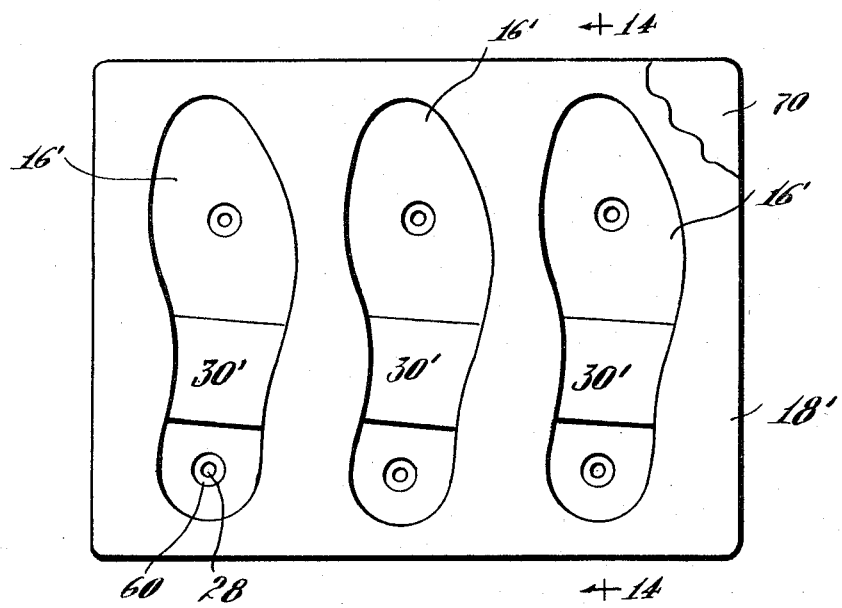
FIG. 13 is a plan view of a multiple mold assembly for making individual soles apart from attachment to the uppers.
Figure 14:
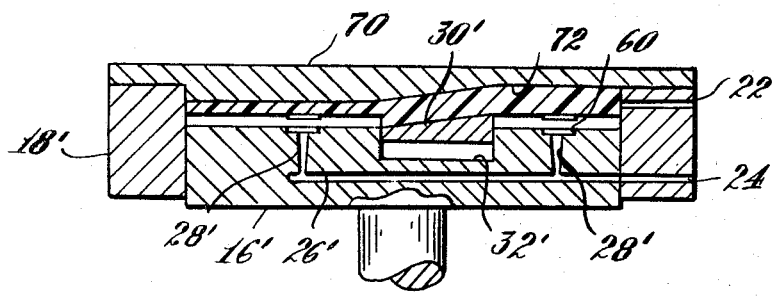
FIG. 14 is a section taken on the line 14—14 of FIG. 13.

FIGS. 13 and 14 disclose apparatus designed to make sole blanks which may later be attached to the bottom of an upper by suitable means, for example adhesive, stapling, stitching and the like. To enable forming the blanks, a flat plate 70 is substituted for the last bottom, the inner surface 72 of the plate being shaped to corresponding curvature to the normal curvature of the bottom of a lasted shoe. In other respects, the assembly is substantially similar to those described above comprising a mold assembly 18' containing a mold cavity, a sole plate 16' movable therein relative to the plate 70 to control the depth of the cavity, a recess 32' in the sole plate and a barrier 30' situated in the recess and fixed relative to the mold 18'. Preferably the assembly is designed to enable making a plurality of bottoms at the same time and so instead of using a single mold ring comprised of two mold halves, a single plate is employed containing three mold cavities corresponding in shape and size to the soles to be made. A corresponding number of cover plates 70 and sole plates 16' are provided.

Although the barrier is described in both the specification and claims as fixed, this means only that it is fixed for a given molding operation since it is evident that if it were desirable to have the barrier closer to or further from the top of the mold cavity this could be provided for by adjustably supporting the barrier on the sides of the mold or upon the bed supporting the mold.

It should be understood that the present disclosure is for the purpose of illustration only and that this invention includes all modifications and equivalents which fall within the scope of the appended claims.

I claim:

1. The combination with a mold assembly of the kind wherein a sole plate is movable in a mold cavity to different positions to enable injection of successive layers of the bottom-forming composition; a barrier recessed into the sole plate, said barrier being fixed at a predetermined level, and said sole plate being movable relative thereto so that the barrier effectively excludes bottom-forming composition from the part of the mold cavity within which it is located in the different positions of said sole plate.

2. The combination with a mold assembly of the kind wherein a sole plate is movable in the mold cavity from a first position to a second position to enable injecting first and second layers of bottom-forming composition into the cavity in succession, a barrier recessed into the sole plate at the shank, said barrier being fixed relative to the cavity and being operative, in conjunction with the sole plate when the latter is in the first position, to form a first layer including a shank, and being operative when the sole plate is moved to said second position to form said second layer to exclude bottom-forming composition from that portion of the first layer with which the barrier had contact following injection of said first layer.

3. Apparatus according to claim 2, wherein the barrier is fixed to the mold part containing the mold cavity.

4. Apparatus according to claim 2, wherein the mold part containing the cavity is a split ring and one-half of the barrier is fixed to each half of the ring.

5. Apparatus according to claim 2, wherein the mold part containing the cavity is a split ring and the entire barrier is fixed to one-half of the ring and extends across the other half.

6. Apparatus according to claim 2, wherein the barrier has at its ends parts extending downwardly through the sole plate, the lower ends of which rest on the bed supporting the mold assembly.

7. The combination with a mold assembly of the kind wherein a sole plate is movable in the mold cavity from a first position to a second position to enable injecting first and second layers of bottom-forming composition into the cavity in succession, a barrier recessed into the sole plate at the heel end, said barrier being fixed relative to the cavity and being operative, in conjunction with the sole plate when the latter is in the first position, to form a first layer including a heel, and being operative when the sole plate is moved to said second position to form said second layer to exclude bottom-forming composition from that portion of the first layer with which the barrier had contact following the first injection.

8. Apparatus according to claim 7, wherein the barrier is fixed to the mold part containing the mold cavity.

9. The combination with a mold assembly of the kind wherein a sole plate is movable in a mold cavity from a first position to a second position to enable injecting first and second layers of bottom-forming composition into the cavity in succession, and wherein bottom-forming composition is injected through the wall of the cavity above the surface of the sole plate when the latter is in the first position directly into the cavity to fill it and through the bottom of the sole plate into the cavity when the sole plate is in the second position, means for blocking the openings in the sole plate when the latter is in the first position comprising parts fitted into the openings in the sole plate, characterized in that they will adhere to the injected bottom-forming composition and be extracted from said openings by movement of the sole plate to said second position.

10. The combination according to claim 9, comprising circular recesses at the ends of the openings in the sole plate, and closure discs fitted into the recesses in the sole plate, characterized in that the discs will adhere to the injected bottom-forming composition and be extracted from said recesses by movement of the sole plate to the second position.

11. The combination according to claim 9, comprising circular recesses at the ends of the openings in the sole plate, and plastic discs compatible with the bottom-forming composition employed fitted into the recesses in said sole plate, characterized in that the discs will adhere to the injected bottom-forming composition and be extracted from said recesses by movement of the sole plate to the second position.

12. The combination with a mold assembly of the kind wherein a sole plate located at the bottom of the mold ring is movable relative to the bottom of a lasted upper held against the top of the mold ring from a first position to a second position to enable injecting first and second layers of bottom-forming composition into the cavity in succession, a barrier recessed into the sole plate below the bottom of the lasted upper at a predetermined level, said barrier being fixed relative to the cavity and being operative, in conjunction with the sole plate when the latter is in the first position, to form a first layer and being operative when the sole plate is moved to said second position to form said second layer to exclude bottom-forming composition from the portion of the first layer with which the barrier had contact following injection of the first layer.

13. Molding apparatus comprising a mold plate containing one or more mold cavities, a cover plate adapted to be held in engagement with the rim of each of the mold cavities, each cover plate having an inner surface which is the converse of the contour of the bottom of the lasted upper, a sole plate supported for movement into each mold cavity beneath the cover plate to enable injecting first and second layers into the mold cavities in succession, barriers recessed into the sole plate, said barriers being fixed relative to the cavities and being operative, in conjunction with the sole plates when the latter are in the first position, to form a first layer and being operative when the sole plates are in their second position to form said second layers to exclude bottom-forming composition from the portions of the first layers with which the barriers had contact following injection of the first layers.

14. Molding apparatus according to claim 13, wherein the barriers are situated within the forepart of the mold cavity.

15. Molding apparatus according to claim 13, wherein the barriers are situated within the shank portions of the mold cavity.

16. Molding apparatus according to claim 13, wherein the barriers are situated within the heel portions of the mold cavity.

References Cited by the Examiner
UNITED STATES PATENTS

| | | | |
|---|---|---|---|
| 3,160,921 | 12/1964 | Ludwig | 18—42 |
| 3,267,520 | 8/1966 | Ludwig | 18—42 XR |
| 3,284,558 | 11/1966 | Ludwig | 18—42 XR |

J. SPENCER OVERHOLSER, *Primary Examiner.*

J. HOWARD FLINT, JR., *Examiner.*